US008200926B1

(12) United States Patent
Stringham

(10) Patent No.: US 8,200,926 B1
(45) Date of Patent: Jun. 12, 2012

(54) METHODS AND SYSTEMS FOR CREATING FULL BACKUPS

(75) Inventor: Russell Stringham, Orem, UT (US)

(73) Assignee: Symantec Corporation, Mountain View, CA (US)

( * ) Notice: Subject to any disclaimer, the term of this patent is extended or adjusted under 35 U.S.C. 154(b) by 366 days.

(21) Appl. No.: 12/473,398

(22) Filed: May 28, 2009

(51) Int. Cl.
G06F 12/00 (2006.01)
G06F 13/00 (2006.01)
G06F 13/28 (2006.01)

(52) U.S. Cl. ........................................................ 711/162
(58) Field of Classification Search .................... 711/162
See application file for complete search history.

(56) References Cited

U.S. PATENT DOCUMENTS

| | | | | |
|---|---|---|---|---|
| 5,835,953 | A * | 11/1998 | Ohran | 711/162 |
| 6,981,114 | B1 * | 12/2005 | Wu et al. | 711/162 |
| 7,472,242 | B1 * | 12/2008 | Deshmukh et al. | 711/162 |
| 7,747,584 | B1 * | 6/2010 | Jernigan, IV | 707/692 |
| 7,797,279 | B1 * | 9/2010 | Starling et al. | 707/641 |
| 7,802,134 | B1 * | 9/2010 | Sobel et al. | 714/15 |
| 7,831,861 | B1 * | 11/2010 | Greene et al. | 714/15 |
| 7,873,601 | B1 * | 1/2011 | Kushwah | 707/654 |
| 8,060,476 | B1 * | 11/2011 | Afonso et al. | 707/649 |
| 8,082,231 | B1 * | 12/2011 | McDaniel et al. | 707/681 |
| 2002/0059505 | A1 * | 5/2002 | St. Pierre et al. | 711/162 |
| 2005/0138312 | A1 * | 6/2005 | Kubo et al. | 711/162 |
| 2005/0240813 | A1 * | 10/2005 | Okada et al. | 714/14 |
| 2006/0031651 | A1 * | 2/2006 | Nonaka et al. | 711/163 |
| 2006/0069886 | A1 * | 3/2006 | Tulyani | 711/161 |
| 2007/0016740 | A1 * | 1/2007 | Somavarapu | 711/162 |
| 2008/0313641 | A1 * | 12/2008 | Inoue et al. | 718/104 |
| 2009/0006640 | A1 * | 1/2009 | Brouwer et al. | 709/231 |
| 2009/0019246 | A1 * | 1/2009 | Murase | 711/162 |
| 2009/0044035 | A1 * | 2/2009 | Taguchi et al. | 713/340 |
| 2009/0177661 | A1 * | 7/2009 | Sandorfi et al. | 707/9 |
| 2010/0077165 | A1 * | 3/2010 | Lu et al. | 711/162 |
| 2011/0078118 | A1 * | 3/2011 | Kushwah | 707/646 |
| 2011/0191291 | A2 * | 8/2011 | Balakrishnan et al. | 707/618 |

OTHER PUBLICATIONS

Russell Stringham; U.S. Appl. No. 12/415,798; Methods and Systems for Creating Full Backups; Mar. 31, 2009.
Non-Final Office Action in U.S. Appl. No. 12/415,798; Mar. 10, 2011.
Final Office Action in related U.S. Appl. No. 12/415,798; Jul. 5, 2011.

* cited by examiner

Primary Examiner — Sheng-Jen Tsai
(74) Attorney, Agent, or Firm — AdvantEdge Law Group

(57) ABSTRACT

A computer-implemented method may include creating a first full backup of a set of data units at a first time. The computer-implemented method may also include identifying one or more data units in the set of data units that have been modified since the first time. The computer-implemented method may further include creating a second full backup of the set of data units by providing copies of the one or more data units that have been modified since the first time and storing references to copies of one or more data units in the set of data units that have not been modified since the first time. The references may be configured such that the second full backup is a standalone backup that is independent of any other backups.

20 Claims, 7 Drawing Sheets

Original Volume
500

| Data | A | C | D | - | - | E | F | - | - | - | G | J |
|---|---|---|---|---|---|---|---|---|---|---|---|---|
| Index | 0 | 1 | 2 | 3 | 4 | 5 | 6 | 7 | 8 | 9 | 10 | 11 |

*FIG. 5*

First Full Backup
600

| Data | Hdr1 | Aref | Cref | Dref | Eref | Fref | Gref | Jref |
|---|---|---|---|---|---|---|---|---|
| Index | 0 | 1 | 2 | 3 | 4 | 5 | 6 | 7 |

*FIG. 6*

Changed Volume
700

| Data | A | - | D | - | - | E | F | C | - | K | G | L |
|---|---|---|---|---|---|---|---|---|---|---|---|---|
| Index | 0 | 1 | 2 | 3 | 4 | 5 | 6 | 7 | 8 | 9 | 10 | 11 |

*FIG. 7*

Data Store
800

| Data | A | C | D | E | F | G | J | K | L |
|---|---|---|---|---|---|---|---|---|---|
| Reference | Aref | Cref | Dref | Eref | Fref | Gref | Jref | Kref | Lref |

*FIG. 8*

Bitmaps
900

| | | | | | | | | | | | | |
|---|---|---|---|---|---|---|---|---|---|---|---|---|
| Original Volume Bitmap | 1 | 1 | 1 | 0 | 0 | 1 | 1 | 0 | 0 | 0 | 1 | 1 |
| Newer Volume Bitmap | 1 | 0 | 1 | 0 | 0 | 1 | 1 | 1 | 0 | 1 | 1 | 1 |
| Modified Blocks Bitmap | 0 | 0 | 0 | 0 | 0 | 0 | 0 | 1 | 0 | 1 | 0 | 1 |
| Iteration | 1 | 2 | 3 | 4 | 5 | 6 | 7 | 8 | 9 | 10 | 11 | 12 |

*FIG. 9*

Second Full Backup
1000

| Data | Hdr2 | Aref | Dref | Eref | Fref | Cref | Kref | Gref | Lref |
|---|---|---|---|---|---|---|---|---|---|
| Index | 0 | 1 | 2 | 3 | 4 | 5 | 6 | 7 | 8 |

*FIG. 10*

METHODS AND SYSTEMS FOR CREATING FULL BACKUPS

BACKGROUND

Traditional backup systems may periodically create a full backup by capturing all allocated blocks (e.g., sectors or clusters) of a volume. Between full backups, a backup system may capture intermediate backups, referred to as incremental backups, that include blocks that have changed since the previous incremental or full backup. An incremental backup may be orders of magnitude smaller and faster than a full backup. Because of the relative efficiency of incremental backups, many enterprises would prefer to take only incremental backups after an initial base backup (a feature referred to as infinite incrementals).

Unfortunately, some traditional backup technologies are not designed to effectively deal with long (or even short) chains of incremental backups. For example, some traditional backup systems may restore a volume (or any other backed-up entity) by opening and reading each backup in the entire chain of backups, including each incremental backup and a base backup (i.e., a full backup). An administrator may not be able to delete any of the backups until none of the backups in the chain are needed for possible restoration.

As an alternative to long chains of incremental backups, synthetic full backups may be created at an intermediate point in a backup chain to allow older points in the chain to be deleted and to keep chain lengths short enough for efficient restoration. However, synthetic full backup creation may involve significant back-end processing (typically on a media server) and may increase the number of objects that are managed. Deduplication software may provide an interface that significantly lowers the cost of synthetic full backup creation by specifying how to reassemble portions of existing backups into a synthetic backup.

Deduplication software may break up each backup in segments with a fingerprint for each segment. The deduplication software may reassemble the synthetic backup by manipulating fingerprints rather than reading all of the specified segment data and writing it back in the new file. Some backup systems may create virtual synthetic backups (i.e., synthetic backups that are created using a more efficient process than is traditionally used to create synthetic backups). However, the creation of virtual synthetic backups may involve some back-end processing and add complexity to backup management. Conventional backup systems may not be able to handle this additional processing.

SUMMARY

Embodiments of the present disclosure are directed to methods and systems for efficiently creating full backups. For example, a backup module may create a first full backup of a set of data units (e.g., a volume) at a first time. At a later time, the backup module may identify one or more data units in the set of data units that have been modified since the first time. The backup module may then create a second full backup by: (1) providing copies of the one or more data units that have been modified since the first time and (2) storing references to copies of one or more data units in the set of data units that have not been modified since the first time. The references may be configured such that the second full backup is a standalone backup that is independent of any other backups.

In some embodiments, creating the first full backup may include providing copies of each data unit in the set of data units in a data store and storing, in the first full backup, references to the data store copies of each data unit in the set of data units. According to certain embodiments, providing copies of each data unit in the set of data units in a data store and providing copies of the one or more data units that have been modified since the first time may include, for each copy of a data unit: (1) determining whether the data store includes a copy of the data unit, (2) if the data store does not include the copy of the data unit, copying the data unit to the data store, and (3) providing a reference to the data store copy of the data unit.

According to various embodiments, the data store may include a deduplication data store. In some embodiments, the second full backup may be created on-the-fly as the data units that have been modified since the first point in time are copied from a protected client subsystem to a backup subsystem. Additionally or alternatively, the second full backup may be created by copying the data units that have been changed directly to the second full backup.

In certain embodiments, at least a substantial portion of the unmodified data units may not be read when the second full backup is created. According to some embodiments, the references in the second full backup may be free from references to any other backups. In various embodiments, creating the second full backup may utilize substantially the same disk input-output, data transmission, and processing resources as creating an incremental backup of the data units that have been modified would utilize. In some embodiments, the set of data units may include data blocks. In certain embodiments, the set of data units may include data sectors and/or data clusters. In at least one embodiment, the set of data units may include files.

In some embodiments, a system may include at least one processor and a backup module. The backup module may direct the at least one processor to create a first full backup of a set of data units at a first time, identify one or more data units in the set of data units that have been modified since the first time, and create a second full backup of the set of data units by: (1) providing copies of the one or more data units that have been modified since the first time and (2) storing references to copies of one or more data units in the set of data units that have not been modified since the first time. The references may be configured such that the second full backup is a standalone backup that is independent of any other backups.

According to certain embodiments, the backup module may direct the at least one processor to create the first full backup by providing copies of each data unit in the set of data units in a data store and storing, in the first full backup, references to the data store copies of each data unit in the set of data units. In various embodiments, the backup module may direct the at least one processor to, for each copy of a data unit: (1) determine whether the data store includes a copy of the data unit, (2) if the data store does not include the copy of the data unit, copy the data unit to the data store, and (3) provide a reference to the data store copy of the data unit. In at least one embodiment, the data store may include a deduplication data store. In certain embodiments, the references in the second full backup may be free from references to any other backups. According to various embodiments, creating the second full backup may utilize substantially the same disk input-output, data transmission, and processing resources as creating an incremental backup of the data units that have been modified would utilize.

According to certain embodiments, a computer-readable-storage medium may include one or more computer-executable instructions that, when executed by a computing device comprising at least one processor, cause the computing device to: (1) create a first full backup of a set of data units at a first time, (2) identify one or more data units in the set of data units that have been modified since the first time, and (3) create a second full backup of the set of data units by providing copies of the one or more data units that have been modified since the first time and storing references to copies of one or more data units in the set of data units that have not been modified since the first time. The references may be configured such that the second full backup is a standalone backup that is independent of any other backups.

In various embodiments, the one or more computer-executable instructions may further cause the computing device to: (1) provide copies of each data unit in the set of data units in a data store, (2) store, in the first full backup, references to the data store copies of each data unit in the set of data units, (3) determine whether the data store includes a copy of the data unit, (4) if the data store does not include the copy of the data unit, copy the data unit to the data store, and (5) provide a reference to the data store copy of the data unit.

Embodiments of the instant disclosure may be implemented in any backup system, such as an online backup system and/or a data deduplication system. Features from any of the above-mentioned embodiments may be used in combination with one another in accordance with the general principles described herein. These and other embodiments, features, and advantages will be more fully understood upon reading the following detailed description in conjunction with the accompanying claims and drawings.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 5 is a block diagram of data in an original volume according to certain embodiments.

FIG. 6 is a block diagram of a first full backup of the original volume shown in FIG. 5.

FIG. 7 is a block diagram of the volume shown in FIG. 5 after changes have been made to the volume.

FIG. 8 is a block diagram of an exemplary data store.

FIG. 9 is a block diagram of exemplary bitmaps associated with the volume shown in FIG. 5, the first full backup shown in FIG. 6, and the changed volume shown in FIG. 7.

FIG. 10 is a block diagram of a second full backup of changed volume 700.

Figure 1:
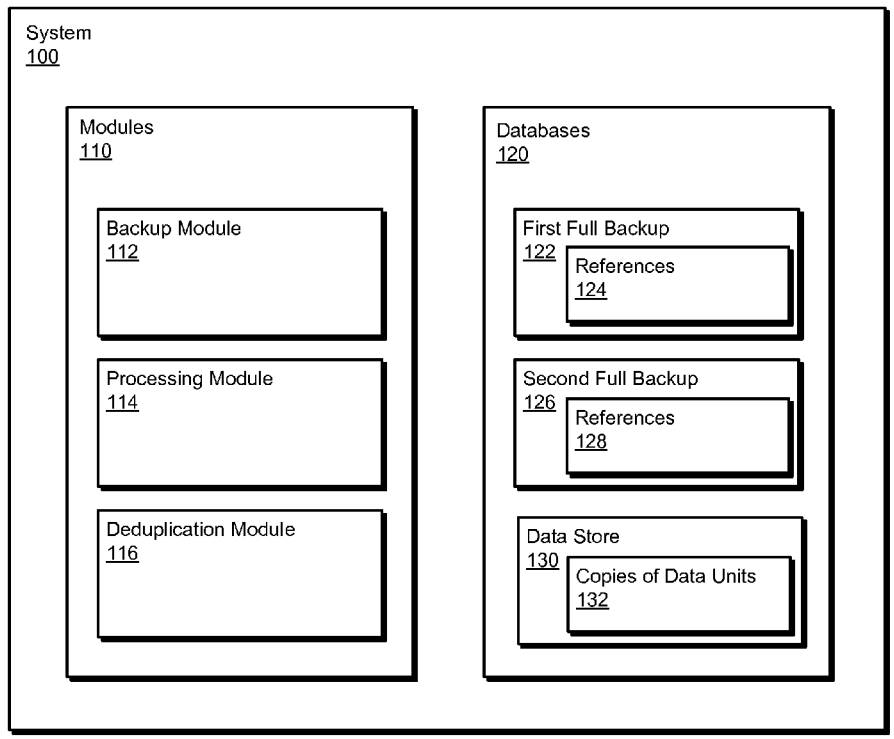
FIG. 1 is a block diagram of an exemplary system for creating full backups according to certain embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Embodiments of the present disclosure provide various methods and systems for creating full backups. In some embodiments, a backup module may create a first full backup of a volume (or other storage entity) at a first time. The backup module may create, at a later time, one or more data units in the set of data units that have been modified since the first time. The backup module may then create a second full backup of the set of data units by providing copies of the one or more data units that have been modified and storing references to copies of the one or more data units in the set of data units that have not been modified since the first time. The references may be configured such that the second full backup is a standalone backup that is independent of any other backups (e.g., the first full backup).

Embodiments of the instant disclosure may provide various features and advantages not provided by traditional backup systems. For example, some embodiments may create full backups for substantially the same cost, in terms of data transmission, input and output, and storage, as incremental backups. Furthermore, in some embodiments each backup after a base backup may be a standalone full backup that is independent of other backups. In such embodiments, a backup system may not need to expend the resources traditionally needed to create periodic full backups. Thus, a backup system may be able to create numerous standalone full backups at a cost that may be roughly the same as the cost of creating incremental backups.

Figure 2:
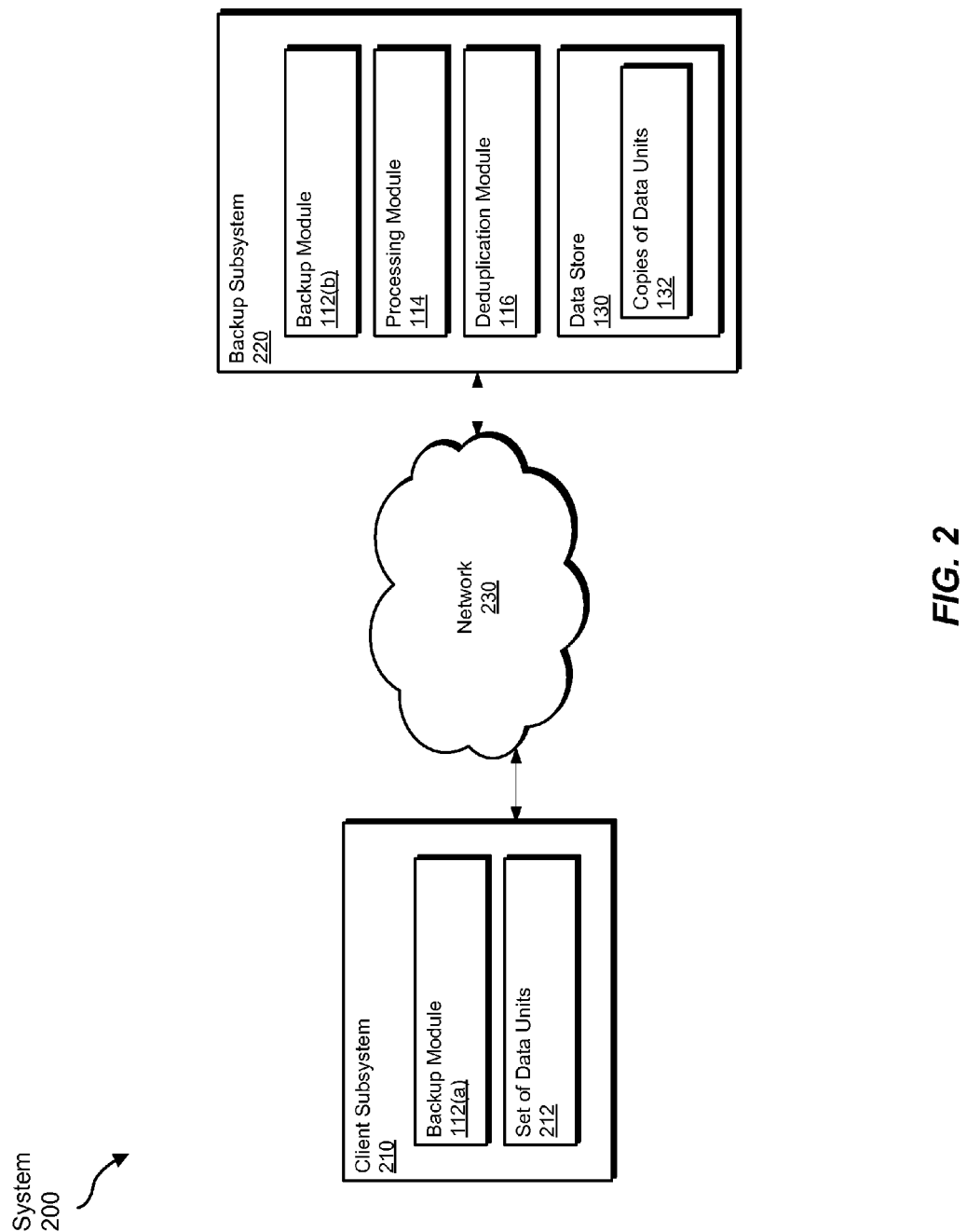
FIG. 2 is a block diagram of an implementation of the system illustrated in FIG. 1 according to certain embodiments.
Figure 3:
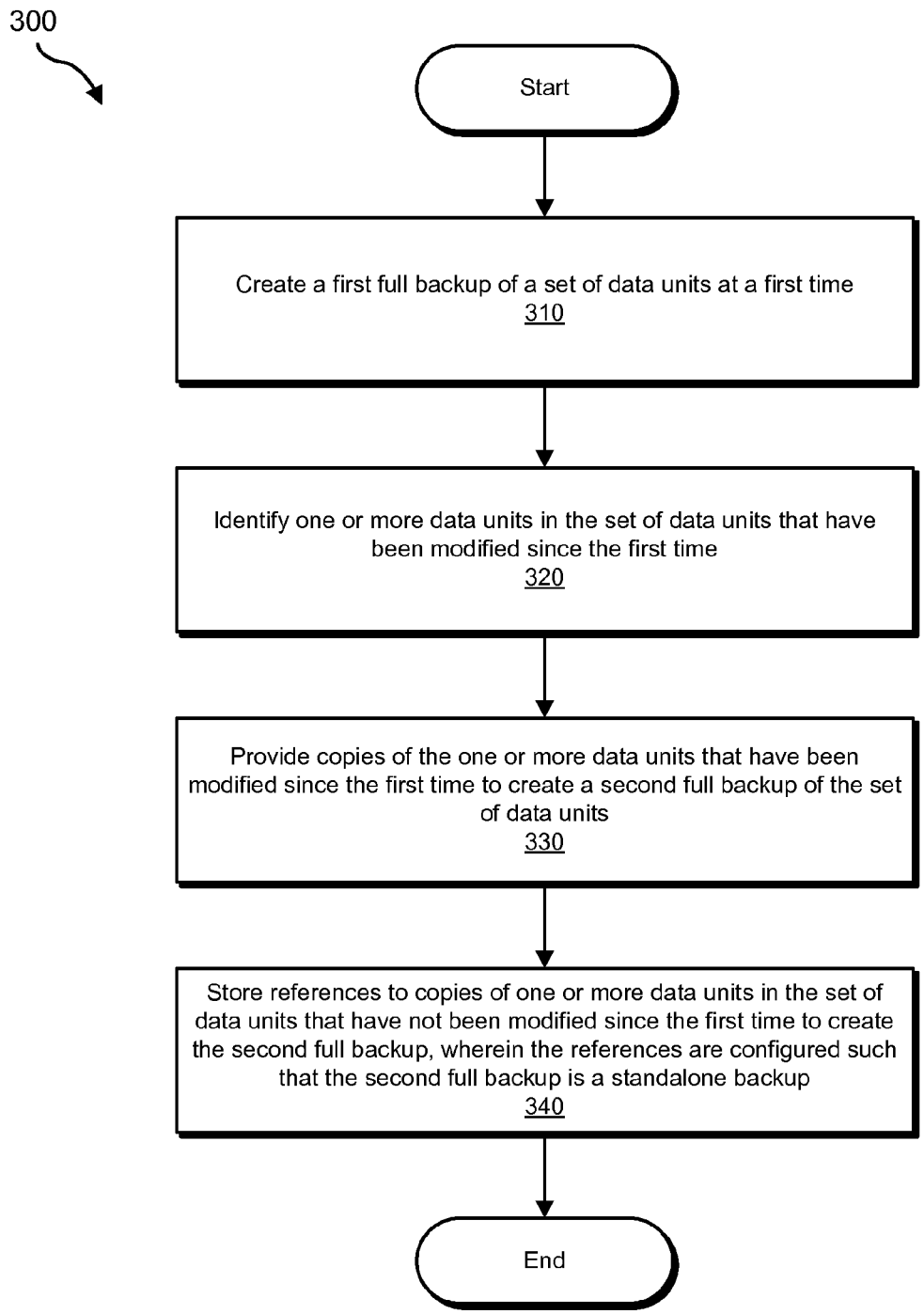
FIG. 3 is a flow diagram of an exemplary method for creating full backups according to certain embodiments.
Figure 4:
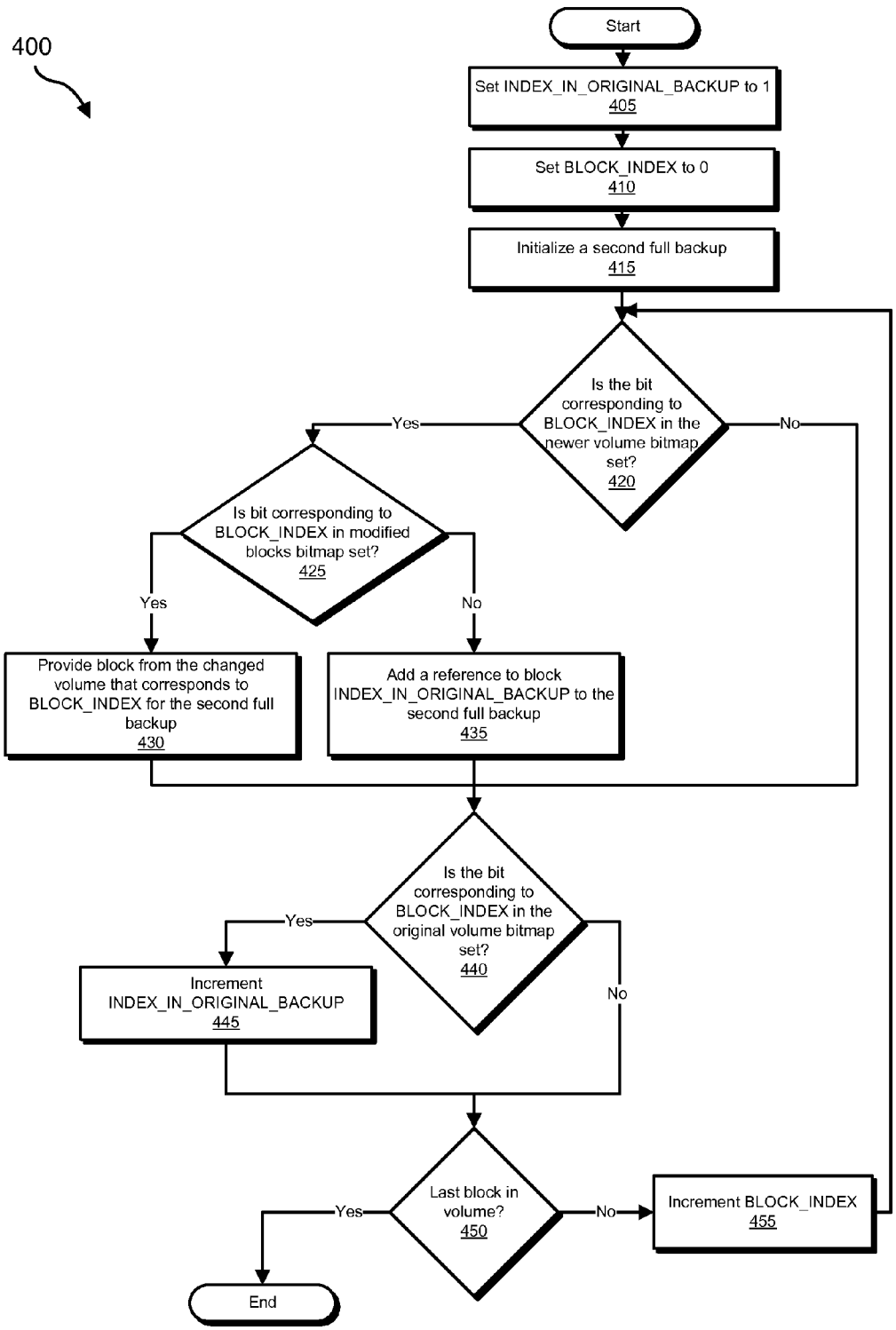
FIG. 4 is another flow diagram of an exemplary method for creating full backups according to certain embodiments.
Figure 11:
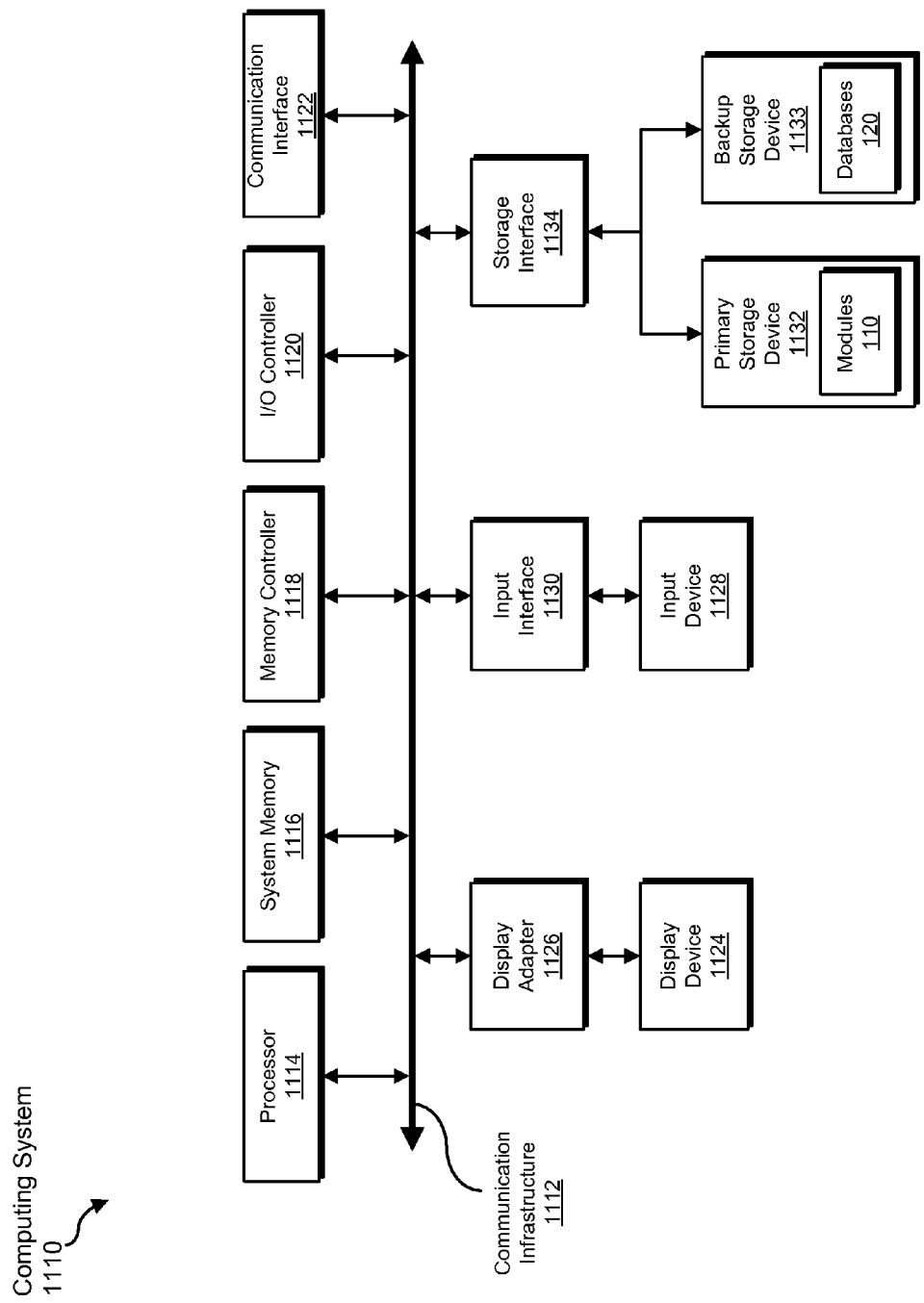
FIG. 11 is a block diagram of an exemplary computing system capable of implementing one or more of the embodiments described and/or illustrated herein.
Figure 12:
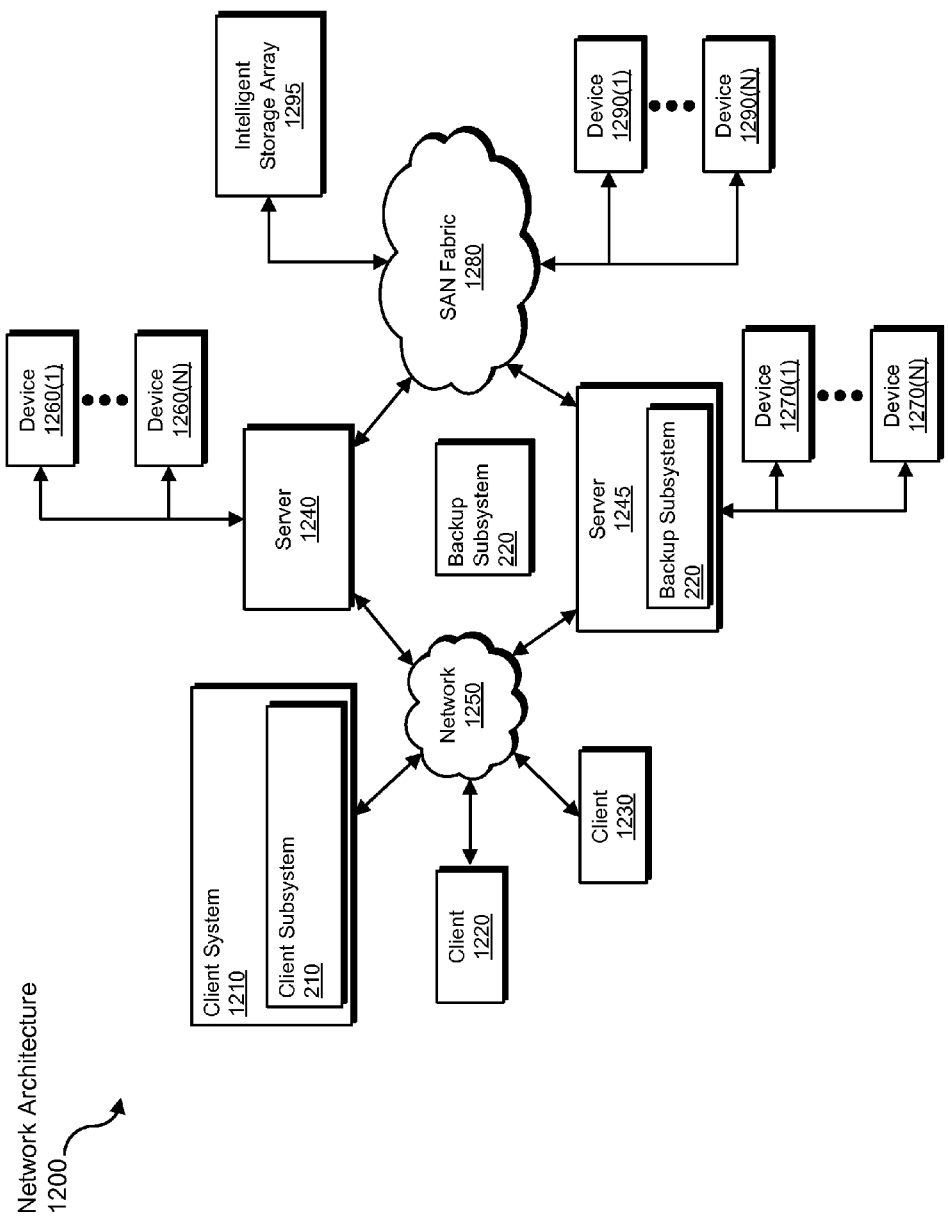
FIG. 12 is a block diagram of an exemplary computing network capable of implementing one or more of the embodiments described and/or illustrated herein.

FIGS. 1 and 2 show exemplary systems for creating full backups, and FIGS. 3 and 4 show exemplary methods for accomplishing the same. FIGS. 5-10 show exemplary block diagrams of volumes and bitmaps involved in creating a full backup. FIGS. 11 and 12 illustrate an exemplary computing system and network architecture for implementing embodiments of the instant disclosure.

FIG. 1 illustrates a backup system 100 for creating full backups. System 100 may include modules 110 and databases 120. Modules 110 may include a backup module 112, a processing module 114, and a deduplication module 116. Backup module 112 may be programmed to create first and second backups in accordance with embodiments described herein. Processing module 114 may be programmed to identify modified data units and perform other processing functions that enable the creation of full backups. Deduplication module 116 may be programmed to deduplicate backup data (e.g., copies of data units).

In certain embodiments, one or more of modules 110 in FIG. 1 may represent one or more software applications or programs that, when executed by a computing system, may cause the computing system to perform one or more steps disclosed herein. For example, as will be described in greater detail below, one or more of modules 110 may represent software modules configured to run on one or more computing devices, such as computing system 1110 in FIG. 11 and/or portions of exemplary network architecture 1200 in FIG. 12. One or more of modules 110 in FIG. 1 may also represent all or portions of one or more special-purpose computers configured to perform one or more of the tasks associated with the steps disclosed herein.

As previously noted, system 100 may include databases 120. Databases 120 may include a first full backup 122, a second full backup 126, and a data store 130. First full backup 122 may include references 124 to one or more copies of data units 132 in data store 130. Second full backup 126 may include references 128 to one or more copies of data units 132 in data store 130. Data store 130 generally represents any data structure configured to store copies of data units. In some embodiments, data store 130 may include a data store of deduplicated data.

One or more databases 120 in FIG. 1 may represent a portion of one or more computing devices. For example, one or more databases 120 may represent a portion of one or more of the subsystems illustrated in FIG. 2, computing system 1110 in FIG. 11, and/or portions of exemplary network architecture 1200 in FIG. 12. Alternatively, one or more databases 120 in FIG. 1 may represent one or more physically separate devices, and/or a single physical device, capable of being accessed by a computing device, such as one or more of the subsystems illustrated in FIG. 2, computing system 1110 in FIG. 11, and/or portions of exemplary network architecture 1200 in FIG. 12.

FIG. 2 illustrates a system 200 that provides an exemplary configuration of components of system 100. System 200 may include a client subsystem 210, a backup subsystem 220, and a network 230. Client subsystem 210 and/or backup subsystem 220 generally represent any type or form of computing device capable of reading computer-executable instructions. Examples of client subsystem 210 and/or backup subsystem 220 include, without limitation, laptops, desktops, servers, cellular phones, personal digital assistants ("PDAs"), multimedia players, embedded systems, combinations of one or more of the same, exemplary computing system 1110 in FIG. 11, or any other suitable computing device.

Client subsystem 210 may include backup module 112(a) and a set of data units 212. Set of data units 212 may generally represent any set of one or more units of data that may be backed up to backup subsystem 220. A set of data units may include any physical and/or logical storage entity. For example, a set of data units may include a volume, a physical disk, a virtual disk, a partition on a drive, a set of one or more data entities (e.g., files, blocks, clusters, sectors), and/or any other data storage area.

Backup subsystem 220 may include backup module 112(b), processing module 114, deduplication module 116, and data store 130. Backup subsystem 220 may represent any system for backing up and/or recovering data. All or a portion of backup module 112 may be located on client subsystem 210, backup subsystem 220, and/or any other subsystem. For example, backup modules 112(a) and 112(b) may represent client and server side portions of a backup software system. In certain embodiments, backup subsystem 220 may include an online backup system (e.g., SYMANTEC PROTECTION NETWORK). Additionally or alternatively, backup subsystem 220 may include a data deduplication system.

Client subsystem 210 and backup subsystem 220 may communicate over network 230. Network 230 generally represents any medium or architecture capable of facilitating communications or data transfer. Network 230 may include, without limitation, the Internet, a wide area network ("WAN"), a local area network ("LAN"), a personal area network ("PAN"), Power Line Communications ("PLC"), a cellular network (e.g., a GSM network), or the like. Network 230 may facilitate communication or data transfer using wireless and/or wired communications.

FIG. 3 shows an exemplary method for creating a full backup. The steps shown in FIG. 3 may be performed by any suitable computer-executable code and/or computing system. In some embodiments, the steps shown in FIG. 3 may be performed by one or more of backup module 112, processing module 114, and/or deduplication module 116. For example, at step 310, backup module 112 may create a first full backup of set of data units 212 at a first time.

As used herein, the phrase "full backup" may refer to any data backup that includes each data unit (e.g., block, sector, cluster, file, etc.) in a set of data units. For example, a full backup of a volume may include each block in the volume. In some embodiments, a full backup may include only those files which have been identified for backup, which means that a full backup may include a subset of the data on a system or volume. In other embodiments, a full backup may include a copy of all data and/or software on a system. For example, a full backup may include an entire data store, regardless of whether or not that data has been changed since a previous backup was performed. A full backup may include all data needed for a complete system restoration. Client subsystem 210 may coordinate with backup subsystem 220 to transfer data to backup subsystem 220 and to create a full backup of set of data units 212. A first full backup of set of data units 212 may be created using any suitable data backup technology.

At step 320, backup module 112 may identify one or more data units in set of data units 212 that have been modified since the first time. Backup module 112 may determine which data units in set of data units 212 have changed in a variety of ways. In some embodiments, backup module 112 may determine which data units in set of data units 212 have been modified by tracking modifications to set of data units 212. Additionally or alternatively, backup module 112 may read archive bits or timestamps associated with files in set of data units 212 to determine whether the files have changed since the most recent full backup.

As used herein, the phrase "modified data unit" may refer to a data unit in which all, or any portion, of data in the data unit has been changed, added, deleted, rewritten, or otherwise modified. Conversely, the phrase "unmodified data unit" may refer to a data unit in which all of the data in the data unit has not been changed.

After identifying the data units that have been modified since the first time, backup module 112 may create a second full backup. Instead of creating an incremental backup, backup module 112 may directly create a full backup. For example, to directly create a second full backup, at step 330 backup module 112 may provide copies of the one or more data units that have been modified since the first time. Backup module 112 may provide the copies of the modified data units in a variety of manners. For example, backup module 112 may determine whether data store 130 includes a copy of each modified data unit. If data store 130 does not include a copy of a data unit, backup module 112 may provide the data unit by copying the data unit to the data store and may include a reference to the data unit in second full backup 126. If data store 130 already includes a copy of the data unit, backup module 112 may not need to copy the data unit to data store 130 and may provide the data unit to second full backup 126 by including a reference to the existing data unit in data store 130 in second full backup 126.

In addition to providing copies of modified data units, at step 340 backup module 112 may create second full backup 126 by storing references to copies of one or more data units in the set of data units that have not been modified since the first time. For example, the unmodified data units may be located in data store 130, and backup module 112 may store, in second full backup 126, references to the unmodified data units in data store 130.

References to unmodified data units may be identified and/or created in any suitable manner. In some embodiments, backup module 112 may store references to copies of the unmodified data units by providing references to data units in first full backup 122 and then resolving those references with references to data units in data store 130. In such embodiments, first full backup 122 may be created by providing copies of each data unit in the set of data units to data store 130 and including references to the copies of each data unit in first full backup 122.

Backup module 112 may create second full backup 126 as a standalone backup. As used herein, the phrase "standalone backup" may refer to a backup that is independent of other backups. In some embodiments, a standalone backup may be a backup that does not include any references to any other backups or depend on other backups in any way. Thus, as a standalone backup, second full backup 126 may be able to restore all data units in set of data units 212 even if first full backup 122 (and/or any other backups) is unavailable, deleted, corrupted and/or compromised in any other way. A full restore of set of data units 212 may be performed by accessing second full backup 126 without accessing any other backups.

Second full backup 126 may be created on-the-fly, meaning that second full backup 126 may be created as the data units that have been modified since the first point in time are copied from a protected client subsystem (e.g., a system backed up by a backup subsystem) to a backup subsystem. In other words, second full backup 126 may be created without conventional intermediate backup steps. For example, second full backup 126 may be created without first creating an incremental backup and/or without storing the modified data units in an intermediate location.

In some embodiments, second full backup 126 may be created by copying the data units that have been changed directly to data store 130 (i.e., without first storing the data units in an incremental backup or other backup storage location). After copying the data units to data store 130, backup module 112 may obtain references to the copies of the modified data units and may store the references in second full backup 126. As used herein, the term "references" may refer to indexes, pointers, fingerprints, hashes, and/or any other information that may be used to identify data units. The references in a second full backup may be free from any reference to any other backups.

As previously noted, embodiments of the instant disclosure may create full backups more quickly and/or more efficiently than conventional backup technologies. For example, backup module 112 may not need to read a substantial portion of the unmodified data units when second full backup 126 is created. In some embodiments, backup module 112 may only read modified data units when creating second full backup 126. In other embodiments, backup module 112 may read the modified data units and only a small subset of unmodified data units when creating second full backup 126.

In other words, little, if any, of the data from previous backups may be read or re-written when creating subsequent full backups. As discussed herein, creating subsequent full backups may be accomplished by manipulating references to the data from the previous backup, along with creating references for the data modified since the time the previous backup was created. Since data from the previous backup is not copied, a subsequent full backup (e.g., second full backup 126) may take up essentially the same amount of space as would an incremental backup. In some embodiments, a subsequent full backup may only be slightly larger (e.g., large enough to hold the references to unmodified data) than a corresponding incremental backup. Since references (e.g., fingerprints) are typically relatively small, the extra space for these references may be minimal.

Accordingly, for essentially the cost of an incremental backup, a full backup may be created. In other words, backup module 112 may create second full backup 126 utilizing substantially the same disk input-output, data transmission, and/or processing resources as creating a corresponding incremental backup would utilize. For example, the only data transmitted across network 230 may be the modified data plus any metadata for identifying the unmodified data. If deduplication is performed by client subsystem 210, the metadata may include references to data units from the previous full backup. If deduplication is performed by backup subsystem 220, the metadata may include offsets and lengths of the data being referenced from the previous backup.

In some embodiments, creating the second full backup may include comparing various bitmaps (or other data representing the states of data volumes). For example, an original system bitmap may indicate a state of each data unit in the set of data units at the first point in time. A newer system bitmap may indicate a state of each data unit in the set of data units at the second point in time. A modified data units bitmap may indicate each data unit that has changed since the first point in time.

Instead of and/or in addition to bitmaps, a list, run-list, or any other suitable data structure may be used to identify data units of interest in the original system, the newer system, and/or the data units that were modified between the first time and the second time. For example, the modified data units may be represented by a change list which identifies the set of data units that have changed. The change list may be implemented as a run-list of blocks that have changed and/or as a list of files.

Steps 330 and 340 of FIG. 3 may be performed in any order. Step 330 may be performed before step 340 and/or step 340 may be performed before step 330. In some embodiments, all or portions of steps 330 and 340 may be interleaved and/or performed simultaneously.

Any suitable algorithm may be implemented for creating the second full backup. For example, some algorithms may include the following steps for each data unit U in the set of data units: providing a data unit corresponding to U to the second full backup if (1) the bit corresponding to U in the new system bitmap is set and (2) the bit corresponding to U in the modified data units bitmap is set; and providing a reference to a data unit from the first full backup if (1) the bit corresponding to U in the new system bitmap is set and (2) the bit corresponding to U in the modified data units bitmap is not set.

The following discussion of FIGS. 4-10 provides an example of creating a second full backup of a volume. While FIGS. 4-10 show an example where data units are data blocks, the example shown in FIGS. 4-10 also applies to other data units, such as files. The steps in FIG. 4 may be performed by backup module 112, processing module 114, and/or any other suitable module. FIG. 4 shows a method that corresponds to the following pseudo code:

INDEX_IN_ORIGINAL_BACKUP=1
    Initialize Second Full Backup
    For each block BLOCK_INDEX in volume:
      If bit corresponding to BLOCK_INDEX in Changed Volume Bitmap is set:

If bit corresponding to BLOCK_INDEX in Modified
    Blocks Bitmap is set:
        Provide block from Changed Volume corresponding
            to BLOCK_INDEX to the Second Full Backup
    Else
        Add reference to block
            INDEX_IN_ORIGINAL_BACKUP to the Second
            Full Backup
If bit corresponding to BLOCK_INDEX in Original Volume Bitmap is set:
    Increment INDEX_IN_ORIGINAL_BACKUP At step 405, processing module 114 may set a variable "INDEX_IN_ORIGINAL_BACKUP" to 1. At step 410, processing module 114 may set a variable "BLOCK_INDEX" to 0. At step 415, processing module 114 may initialize a second full backup. For example, processing module 114 may add header information to a second full backup.

Processing module 114 may perform steps 420-445 for each block in a backed-up volume. For example, at decision point 420 processing module 114 may determine whether the bit corresponding to BLOCK_INDEX in the newer volume bitmap is set. If the bit corresponding to BLOCK_INDEX in the newer volume bitmap is set, at decision point 425 processing module 114 may determine whether the bit corresponding to BLOCK_INDEX in a modified blocks bitmap is set. If the bit corresponding to BLOCK_INDEX in the modified blocks bitmap is set, at step 430 processing module 114 may provide a block corresponding to BLOCK_INDEX to the second full backup (as previously noted, a block may be provided by checking for the block in a data store, adding the block to the data store if the block is not already in the data store, and in either case, including a reference to the data store block to the second full backup). Otherwise, at step 435 processing module 114 may add a reference to a block corresponding to INDEX_IN_ORIGINAL_BACKUP to the second full backup (the backup application may access the first backup directly at INDEX_IN_ORIGINAL_VOLUME to obtain the reference for the same block from the original backup. Alternately, it may derive a logical offset in the first backup from INDEX_IN_ORIGINAL_VOLUME and pass this logical offset and the data unit size to a deduplication system which would then copy the reference from the first backup and store it in the second backup).

At decision point 440, processing module 114 may determine whether the bit corresponding to BLOCK_INDEX in an original volume bitmap is set. If the bit corresponding to BLOCK_INDEX in the original system bitmap is set, at step 445 processing module 114 may increment INDEX_IN_ORIGINAL_BACKUP. At decision point 450, processing module 114 may determine whether BLOCK_INDEX is at the last block in the volume. If it is not, processing module 114 may increment BLOCK_INDEX and repeat steps 420-450. If BLOCK_INDEX is at the last block in the volume, process 400 may terminate.

The following discussion presents an example of how a second full backup may be created by applying the method shown in FIG. 4 to the volumes, backups, bitmaps, and data store shown in FIGS. 5-10. FIG. 5 shows an original volume 500, which may represent a volume that is backed up by backup module 112. It is noted that data blocks with different letters may have different data, while blocks with the same letter (at later points in time) may contain identical data. Furthermore, data blocks with dashes are blocks that are not allocated by the file system at the first point in time or are excluded from the full backup for any other reason. FIG. 6 shows a first full backup 600 of original volume 500. Backup module 112 may create first full backup 600 at a first time.

FIG. 7 shows a changed volume 700. FIG. 7 represents the state of original volume 500 at a second time, after changes have been made. FIG. 8 shows a data store where backed-up data may be stored. FIG. 9 shows exemplary bitmaps 900 associated with original volume 500 and changed volume 700, and FIG. 10 shows a second full backup 1000 created by the process of FIG. 4.

In a first iteration through FIG. 4, the bit corresponding to BLOCK_INDEX is set in the Newer Volume Bitmap, but the bit corresponding to BLOCK_INDEX is not set in the Modified Blocks Bitmap, so the reference stored at location INDEX_IN_ORIGINAL_BACKUP in the first backup is added to second full backup 1000, such that second full backup 1000 includes "Hdr2, Aref." In this example, the notation #ref is used to refer to blocks in data store 800, where # is a reference letter to a block in the data store. Since the bit corresponding to BLOCK_INDEX is set in the Original Volume Bitmap, INDEX_IN_ORIGINAL_BACKUP is incremented to 2. In the second iteration, the bit corresponding to BLOCK_INDEX is not set in the Newer Volume Bitmap, so nothing is added to the second full backup, but because the bit corresponding to BLOCK_INDEX is set in the Original Volume Bitmap, INDEX_IN_ORIGINAL_BACKUP is incremented to 3. Following the same process, after the third iteration second full backup 1000 includes "Hdr2, Aref, Dref," and INDEX_IN_ORIGINAL_BACKUP is incremented to 4.

No changes are made to second full backup 1000 or INDEX_IN_ORIGINAL_BACKUP during the fourth or fifth iterations, and during the sixth iteration second full backup 1000 is updated to "Hdr2, Aref, Dref, Eref." During the sixth iteration, INDEX_IN_ORIGINAL_BACKUP is incremented to 5. During the seventh iteration second full backup 1000 is updated to "Hdr2, Aref, Dref, Eref, Fref," and INDEX_IN_ORIGINAL_BACKUP is incremented to 6. During the eighth iteration, the bit corresponding to BLOCK_INDEX is set in the Newer Volume Bitmap and is also set in the Modified Blocks Bitmap. Therefore, processing module 114 may attempt to add the block corresponding to BLOCK_INDEX (block C) to the Data Store, but a deduplication system would be able to discover that C is already present in the data store (because it was placed there by the first backup). The deduplication or backup system would return a reference to C that is added to the second full backup. Thus, second full backup 1000 may include "Hdr2, Aref, Dref, Eref, Fref, Cref," and INDEX_IN_ORIGINAL_ BACKUP may be incremented to 6.

Processing module 114 may not make any changes during the ninth iteration, and during the tenth iteration processing module 114 may determine that the bits corresponding to BLOCK_INDEX are set in the Newer Volume Bitmap and in the Modified Blocks Bitmap. Processing module 114 may therefore read the block corresponding to BLOCK_INDEX of the updated volume (block K) out of the updated volume. If block K is not already in the data store, block K may be copied to the data store. A reference to block K may be added to second full backup 1000 such that second full backup 1000 includes "Hdr2, Aref, Dref, Eref, Fref, Cref, Kref." During the eleventh iteration second full backup 1000 may be updated to "Hdr2, Aref, Dref, Eref, Fref, Cref, Kref, Gref," and INDEX_IN_ORIGINAL_BACKUP may be updated to 7. During the twelfth and final iteration, second full backup 1000 may be updated to "Hdr2, Aref, Dref, Eref, Fref, Cref, Kref, Gref, Lref," which are the values shown in FIG. 10. Alternatively, the backup module 112 may instead include references to first full backup 600 in the second full backup that it writes to deduplication module 116. The deduplication module 116 could immediately access the first full backup 600 to obtain the corresponding references to data blocks in data store 800 and substitute these references for the references to the first full backup. Then as the deduplication module 116 stores the second full backup 1000, it will only contain references to the data store 800 without including references to first full backup 600.

FIG. 11 is a block diagram of an exemplary computing system 1110 capable of implementing one or more of the embodiments described and/or illustrated herein. Computing system 1110 broadly represents any single or multi-processor computing device or system capable of executing computer-readable instructions. Examples of computing system 1110 include, without limitation, workstations, laptops, client-side terminals, servers, distributed computing systems, handheld devices, or any other computing system or device. In its most basic configuration, computing system 1110 may comprise at least one processor 1114 and system memory 1116.

Processor 1114 generally represents any type or form of processing unit capable of processing data or interpreting and executing instructions. In certain embodiments, processor 1114 may receive instructions from a software application or module. These instructions may cause processor 1114 to perform the functions of one or more of the exemplary embodiments described and/or illustrated herein. For example, processor 1114 may perform and/or be a means for performing, either alone or in combination with other elements, one or more of the creating, identifying, storing, and replacing steps described herein. Processor 1114 may also perform and/or be a means for performing any other steps, methods, or processes described and/or illustrated herein.

System memory 1116 generally represents any type or form of volatile or non-volatile storage device or medium capable of storing data and/or other computer-readable instructions. Examples of system memory 1116 include, without limitation, random access memory (RAM), read only memory (ROM), flash memory, or any other suitable memory device. Although not required, in certain embodiments computing system 1110 may comprise both a volatile memory unit (such as, for example, system memory 1116) and a non-volatile storage device (such as, for example, primary storage device 1132, as described in detail below).

In certain embodiments, exemplary computing system 1110 may also comprise one or more components or elements in addition to processor 1114 and system memory 1116. For example, as illustrated in FIG. 11, computing system 1110 may comprise a memory controller 1118, an Input/Output (I/O) controller 1120, and a communication interface 1122, each of which may be interconnected via a communication infrastructure 1112. Communication infrastructure 1112 generally represents any type or form of infrastructure capable of facilitating communication between one or more components of a computing device. Examples of communication infrastructure 1112 include, without limitation, a communication bus (such as an ISA, PCI, PCIe, or similar bus) and a network.

Memory controller 1118 generally represents any type or form of device capable of handling memory or data or controlling communication between one or more components of computing system 1110. For example, in certain embodiments memory controller 1118 may control communication between processor 1114, system memory 1116, and I/O controller 1120 via communication infrastructure 1112. In certain embodiments, memory controller 1118 may perform and/or be a means for performing, either alone or in combination with other elements, one or more of the steps or features described and/or illustrated herein, such as creating, identifying, storing, and replacing.

I/O controller 1120 generally represents any type or form of module capable of coordinating and/or controlling the input and output functions of a computing device. For example, in certain embodiments I/O controller 1120 may control or facilitate transfer of data between one or more elements of computing system 1110, such as processor 1114, system memory 1116, communication interface 1122, display adapter 1126, input interface 1130, and storage interface 1134. I/O controller 1120 may be used, for example, to perform and/or be a means for performing one or more of the creating, identifying, storing, and replacing steps described herein. I/O controller 1120 may also be used to perform and/or be a means for performing other steps and features set forth in the instant disclosure.

Communication interface 1122 broadly represents any type or form of communication device or adapter capable of facilitating communication between exemplary computing system 1110 and one or more additional devices. For example, in certain embodiments communication interface 1122 may facilitate communication between computing system 1110 and a private or public network comprising additional computing systems. Examples of communication interface 1122 include, without limitation, a wired network interface (such as a network interface card), a wireless network interface (such as a wireless network interface card), a modem, and any other suitable interface. In at least one embodiment, communication interface 1122 may provide a direct connection to a remote server via a direct link to a network, such as the Internet. Communication interface 1122 may also indirectly provide such a connection through, for example, a local area network (such as an Ethernet network or a wireless IEEE 802.11 network), a personal area network (such as a BLUETOOTH or IEEE Standard 802.15.1-2002 network), a telephone or cable network, a cellular telephone connection, a satellite data connection, or any other suitable connection.

In certain embodiments, communication interface 1122 may also represent a host adapter configured to facilitate communication between computing system 1110 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 1122 may also allow computing system 1110 to engage in distributed or remote computing. For example, communication interface 1122 may receive instructions from a remote device or send instructions to a remote device for execution. In certain embodiments, communication interface 1122 may perform and/or be a means for performing, either alone or in combination with other elements, one or more of the creating, identifying, storing, and replacing steps disclosed herein. Communication interface 1122 may also be used to perform and/or be a means for performing other steps and features set forth in the instant disclosure.

As illustrated in FIG. 11, computing system 1110 may also comprise at least one display device 1124 coupled to communication infrastructure 1112 via a display adapter 1126. Display device 1124 generally represents any type or form of device capable of visually displaying information forwarded by display adapter 1126. Similarly, display adapter 1126 generally represents any type or form of device configured to forward graphics, text, and other data from communication infrastructure 1112 (or from a frame buffer, as known in the art) for display on display device 1124.

As illustrated in FIG. 11, exemplary computing system 1110 may also comprise at least one input device 1128 coupled to communication infrastructure 1112 via an input interface 1130. Input device 1128 generally represents any type or form of input device capable of providing input, either computer or human generated, to exemplary computing system 1110. Examples of input device 1128 include, without limitation, a keyboard, a pointing device, a speech recognition device, or any other input device. In at least one embodiment, input device 1128 may perform and/or be a means for performing, either alone or in combination with other elements, one or more of the creating, identifying, storing, and replacing steps disclosed herein. Input device 1128 may also be used to perform and/or be a means for performing other steps and features set forth in the instant disclosure.

As illustrated in FIG. 11, exemplary computing system 1110 may also comprise a primary storage device 1132 and a backup storage device 1133 coupled to communication infrastructure 1112 via a storage interface 1134. As shown, storage device 1132 may include one or more of modules 110 for performing embodiments of the present disclosure. Similarly, backup storage device 1133 may include one or more of databases 120. Storage devices 1132 and 1133 generally represent any type or form of storage device or medium capable of storing data and/or other computer-readable instructions. For example, storage devices 1132 and 1133 may be a magnetic disk drive (e.g., a so-called hard drive), a floppy disk drive, a magnetic tape drive, an optical disk drive, a flash drive, or the like. Storage interface 1134 generally represents any type or form of interface or device for transferring data between storage devices 1132 and 1133 and other components of computing system 1110.

In certain embodiments, storage devices 1132 and 1133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1132 and 1133 may also comprise other similar structures or devices for allowing computer software, data, or other computer-readable instructions to be loaded into computing system 1110. For example, storage devices 1132 and 1133 may be configured to read and write software, data, or other computer-readable information. Storage devices 1132 and 1133 may also be a part of computing system 1110 or may be a separate device accessed through other interface systems.

Storage devices 1132 and 1133 may also be used, for example, to perform and/or be a means for performing, either alone or in combination with other elements, one or more of the creating, identifying, storing, and replacing steps disclosed herein. Storage devices 1132 and 1133 may also be used to perform and/or be a means for performing other steps and features set forth in the instant disclosure.

Many other devices or subsystems may be connected to computing system 1110. Conversely, all of the components and devices illustrated in FIG. 11 need not be present to practice the embodiments described and/or illustrated herein. The devices and subsystems referenced above may also be interconnected in different ways from that shown in FIG. 11. Computing system 1110 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 1110. All or a portion of the computer program stored on the computer-readable medium may then be stored in system memory 1116 and/or various portions of storage devices 1132 and 1133. When executed by processor 1114, a computer program loaded into computing system 1110 may cause processor 1114 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1110 may be configured as an application specific integrated circuit (ASIC) adapted to implement one or more of the exemplary embodiments disclosed herein.

FIG. 12 is a block diagram of an exemplary network architecture 1200 in which client systems 1210, 1220, and 1230 and servers 1240 and 1245 may be coupled to a network 1250. As shown, client system 1210 may include client subsystem 210. Client systems 1210, 1220, and 1230 generally represent any type or form of computing device or system, such as exemplary computing system 1110 in FIG. 11. Similarly, servers 1240 and 1245 generally represent computing devices or systems, such as application servers or database servers, configured to provide various database services and/or to run certain software applications. Server 1245 may include backup subsystem 220. Network 1250 generally represents any telecommunication or computer network; including, for example, an intranet, a wide area network (WAN), a local area network (LAN), a personal area network (PAN), or the Internet.

As illustrated in FIG. 12, one or more storage devices 1260(1)-(N) may be directly attached to server 1240. Similarly, one or more storage devices 1270(1)-(N) may be directly attached to server 1245. Storage devices 1260(1)-(N) and storage devices 1270(1)-(N) generally represent any type or form of storage device or medium capable of storing data and/or other computer-readable instructions. In certain embodiments, storage devices 1260(1)-(N) and storage devices 1270(1)-(N) may represent network-attached storage (NAS) devices configured to communicate with servers 1240 and 1245 using various protocols, such as NFS, SMB, or CIFS.

Servers 1240 and 1245 may also be connected to a storage area network (SAN) fabric 1280. SAN fabric 1280 generally represents any type or form of computer network or architecture capable of facilitating communication between a plurality of storage devices. SAN fabric 1280 may facilitate communication between servers 1240 and 1245 and a plurality of storage devices 1290(1)-(N) and/or an intelligent storage array 1295. SAN fabric 1280 may also facilitate, via network 1250 and servers 1240 and 1245, communication between client systems 1210, 1220, and 1230 and storage devices 1290(1)-(N) and/or intelligent storage array 1295 in such a manner that devices 1290(1)-(N) and array 1295 appear as locally attached devices to client systems 1210, 1220, and 1230. As with storage devices 1260(1)-(N) and storage devices 1270(1)-(N), storage devices 1290(1)-(N) and intelligent storage array 1295 generally represent any type or form of storage device or medium capable of storing data and/or other computer-readable instructions.

In certain embodiments, and with reference to exemplary computing system 1110 of FIG. 11, a communication interface, such as communication interface 1122 in FIG. 11, may be used to provide connectivity between each client system 1210, 1220, and 1230 and network 1250. Client systems 1210, 1220, and 1230 may be able to access information on server 1240 or 1245 using, for example, a web browser or other client software. Such software may allow client systems 1210, 1220, and 1230 to access data hosted by server 1240, server 1245, storage devices 1260(1)-(N), storage devices 1270(1)-(N), storage devices 1290(1)-(N), or intelligent storage array 1295. Although FIG. 12 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1240, server 1245, storage devices 1260(1)-(N), storage devices 1270(1)-(N), storage devices 1290(1)-(N), intelligent storage array 1295, or any combination thereof. All or a portion of one or more of the exemplary embodiments disclosed herein may also be encoded as a computer program, stored in server 1240, run by server 1245, and distributed to client systems 1210, 1220, and 1230 over network 1250. Accordingly, network architecture 1200 may perform and/or be a means for performing, either alone or in combination with other elements, one or more of the creating, identifying, storing, and replacing steps disclosed herein. Network architecture 1200 may also be used to perform and/or be a means for performing other steps and features set forth in the instant disclosure.

Embodiments of the instant disclosure may be implemented in cloud computing environments. Cloud computing environments may provide various services and applications via the internet. These cloud-based services (e.g., software as a service, platform as a service, infrastructure as a service, etc.) may be accessible through a web browser or other remote interface. For example, backup subsystem 220 may be provided through a cloud computing environment. Thus, backup services, applications, and other functionality described herein may be provided through a remote desktop environment or any other cloud-based computing environment.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein. These software modules may also be configured to transform original data (e.g., a volume) into a backup (e.g., through the process illustrated in FIG. 4).

The preceding description has been provided to enable others skilled in the art to best utilize various aspects of the exemplary embodiments described herein. This exemplary description is not intended to be exhaustive or to be limited to any precise form disclosed. Many modifications and variations are possible without departing from the spirit and scope of the instant disclosure. It is desired that the embodiments described herein be considered in all respects illustrative and not restrictive and that reference be made to the appended claims and their equivalents for determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

I claim:

1. A computer-implemented method, at least a portion of the method being performed by a computing system comprising at least one processor, the method comprising:
   creating a first full backup of a set of data units at a first time;
   identifying one or more data units in the set of data units that have been modified since the first time;
   creating a second full backup of the set of data units by:
      providing copies of the one or more data units that have been modified since the first time;
      storing references to copies of one or more data units in the set of data units that have not been modified since the first time, wherein the references are configured such that the second full backup is a standalone backup that is independent of any other backups and at least a portion of the unmodified data units are not read when the second full backup is created.

2. The computer-implemented method of claim 1, wherein:
   creating the first full backup comprises:
      providing copies of each data unit in the set of data units in a data store;
      storing, in the first full backup, references to the data store copies of each data unit in the set of data units.

3. The computer-implemented method of claim 2, wherein:
   providing copies of each data unit in the set of data units in the data store and providing copies of the one or more data units that have been modified since the first time comprise, for each copy of a data unit:
      determining whether the data store includes a copy of the data unit;

if the data store does not include the copy of the data unit, copying the data unit to the data store;
providing a reference to the data store copy of the data unit.

4. The computer-implemented method of claim 3, wherein:
the data store comprises a deduplication data store;
providing copies of the one or more data units that have been modified since the first time comprises copying the one or more data units that have been modified to the deduplication data store without first storing the one or more data units that have been modified to any other backup storage location.

5. The computer-implemented method of claim 4, wherein:
one or more of the references to copies of the one or more data units in the set of data units that have not been modified since the first time comprise offset and length information of data being referenced from the first full backup.

6. The computer-implemented method of claim 1, further comprising:
identifying a changed volume data structure that indicates a state of each data unit in the set of data units at a second time;
identifying a modified data units data structure that indicates each data unit that has changed since the first point in time;
for each data unit in the set of data units:
determining whether the changed volume data structure indicates that the data unit is still present in the volume at the second time;
determining whether the modified data units data structure indicates that the data unit has been modified since the first time;
if the data unit is present and has been modified, performing the providing of the copy of the data unit;
if the data unit is present and has not been modified, performing the storing of the reference to the copy of the data unit.

7. The computer-implemented method of claim 1, wherein none of the unmodified data units are read when the second full backup is created.

8. The computer-implemented method of claim 1, wherein:
creating the second full backup utilizes substantially the same disk input-output, data transmission, and processing resources as creating an incremental backup of the data units that have been modified would utilize;
the second full backup is created without first creating the incremental backup and without storing the modified data units in an intermediate location.

9. The computer-implemented method of claim 1, wherein the second full backup does not include any references to data stored in any other backup.

10. The computer-implemented method of claim 9, wherein storing references to copies of the one or more data units in the set of data units that have not been modified since the first time comprises manipulating a reference located in the first full backup and storing the manipulated reference in the second full backup.

11. The computer-implemented method of claim 1, wherein the set of data units comprises files.

12. A system comprising:
at least one processor;
a backup module that directs the at least one processor to:
create a first full backup of a set of data units at a first time;
identify one or more data units in the set of data units that have been modified since the first time;
create a second full backup of the set of data units by:
providing copies of the one or more data units that have been modified since the first time;
storing references to copies of one or more data units in the set of data units that have not been modified since the first time, wherein the references are configured such that the second full backup is a standalone backup that is independent of any other backups and at least a portion of the unmodified data units are not read when the second full backup is created.

13. The system of claim 12, wherein:
the backup module directs the at least one processor to create the first full backup by:
providing copies of each data unit in the set of data units in a data store;
storing, in the first full backup, references to the data store copies of each data unit in the set of data units.

14. The system of claim 13, wherein:
the backup module directs the at least one processor to provide copies of each data unit in the set of data units in the data store and provide copies of the one or more data units that have been modified since the first time, for each copy of a data unit, by:
determining whether the data store includes a copy of the data unit;
if the data store does not include the copy of the data unit, copying the data unit to the data store;
providing a reference to the data store copy of the data unit.

15. The system of claim 12, wherein the second full backup is created without reading any of the unmodified data units.

16. The system of claim 12, wherein creating the second full backup utilizes substantially the same disk input-output, data transmission, and processing resources as creating an incremental backup of the data units that have been modified would utilize.

17. A computer-readable-storage medium comprising one or more computer-executable instructions that, when executed by a computing device comprising at least one processor, cause the computing device to:
create a first full backup of a set of data units at a first time;
identify a changed volume data structure that indicates a state of each data unit in the set of data units at a second time that is after the first time;
identify a modified data units data structure that indicates each data unit that has changed since the first point in time;
compare the modified data units data structure with the changed volume data structure to identify one or more data units in the set of data units that have been modified since the first time;
create a second full backup of the set of data units by:
providing copies of the one or more data units that have been modified since the first time;
storing references to copies of one or more data units in the set of data units that have not been modified since the first time, wherein the references are configured such that the second full backup is a standalone backup that is independent of any other backups.

18. The computer-readable storage medium of claim 17, wherein:
the one or more computer-executable instructions that cause the computing device to create the first full backup further cause the computing device to:
provide copies of each data unit in the set of data units in a data store;

store, in the first full backup, references to the data store copies of each data unit in the set of data units instead of storing data units in the first full backup;

the one or more computer-executable instructions that cause the computing device to provide copies of each data unit in the set of data units in the data store and provide copies of the one or more data units that have been modified since the first time further cause the computing device to, for each copy of a data unit:

determine whether the data store includes a copy of the data unit;

if the data store does not include the copy of the data unit, copy the data unit to the data store;

provide a reference to the data store copy of the data unit;

include the reference to the data store copy of the data unit in the second full backup instead of providing the data unit in the second full backup.

19. The computer-readable storage medium of claim 18, wherein the data store comprises a deduplication data store.

20. The computer-readable storage medium of claim 17, wherein the one or more computer-executable instructions cause the computing device to create the second full backup by utilizing substantially the same disk input-output, data transmission, and processing resources as creating an incremental backup of the data units that have been modified would utilize.

* * * * *